United States Patent
Schutz

(10) Patent No.: US 6,179,001 B1
(45) Date of Patent: Jan. 30, 2001

(54) QUICK CONNECT COUPLING WITH CONCENTRIC CONFIGURATION

(75) Inventor: Christiaan A. Schutz, Raamsdonksveer (NL)

(73) Assignee: B.V. Holmatro Industrial Equipment, Raamsdonkveer (NL)

( * ) Notice: Under 35 U.S.C. 154(b), the term of this patent shall be extended for 0 days.

(21) Appl. No.: 09/051,166

(22) PCT Filed: Oct. 2, 1996

(86) PCT No.: PCT/NL96/00384

§ 371 Date: Aug. 19, 1998

§ 102(e) Date: Aug. 19, 1998

(87) PCT Pub. No.: WO97/13095

PCT Pub. Date: Apr. 10, 1997

(30) Foreign Application Priority Data

Oct. 5, 1995 (NL) .................................................. 1001357

(51) Int. Cl.[7] ..................................................... F15L 29/04
(52) U.S. Cl. ................................. 137/614.03; 137/614.01
(58) Field of Search ......................... 137/614.01, 614.03, 137/614.04

(56) References Cited

U.S. PATENT DOCUMENTS

| | | | |
|---|---|---|---|
| 4,219,048 | * 8/1980 | Ekman | 137/614.03 |
| 4,991,626 | * 2/1991 | Grantham | 137/614.03 |
| 5,014,743 | * 5/1991 | Makishima | 137/614.03 |
| 5,297,574 | * 3/1994 | Healy. | |

FOREIGN PATENT DOCUMENTS

| | | | |
|---|---|---|---|
| 616242 | * 3/1961 | (CA) | 137/614.03 |
| 0172996 | * 3/1986 | (EP). | |
| 2466697 | * 4/1981 | (FR). | |

* cited by examiner

Primary Examiner—John Fox
(74) Attorney, Agent, or Firm—Banner & Witcoff, Ltd.

(57) ABSTRACT

A rapid-action coupling comprising a male part connected to a first and a third conduit and a female part connected to a second and a fourth conduit for releasable mutual connection of at least the first to the second conduit and also for releasable mutual connection of the third conduit to the fourth conduit. The male part and the female part of the rapid-action coupling each comprise a shell formed in one piece and a plurality of connecting channels. At least at the position of the separating surface between the male and the female parts, the connecting channels arranged in the parts are preferably concentric. According to another embodiment the first and the third conduit and the second and the fourth conduit are mutually concentric.

14 Claims, 3 Drawing Sheets

QUICK CONNECT COUPLING WITH CONCENTRIC CONFIGURATION

The invention relates to a rapid-action coupling.

Such rapid-action couplings are known.

They are used for instance to couple conduits which are adapted to transport a fluid, for instance a gas or a liquid. Such rapid-action couplings are thus used for instance to mutually connect flexible hydraulic conduits.

Particularly to the case of applications in hydraulics, for instance connecting a hydraulically driven apparatus to a hydraulic drive element, it is necessary for the hydraulic pump to be connected to the tool not only by means of a pressure line but also by a return line.

According to the prior art use is made herein of separate rapid-action couplings, i.e. one for the pressure line and another for the return line.

This is less than desirable in many situations, particularly when such a connection must be effected within a short space of time. Such a situation also occurs for instance when such a connection must be effected in a stress situation. There is also the danger here, if the couplings are not different, of an incorrect connection being made.

From GB-L-009087 is known a rapid-action coupling comprising a male part connected to a first and a third conduit and a female part connected to a second and a fourth conduit for releasable mutual connection of at least the first to the second conduit and for releasable mutual connection of the third conduit to the fourth conduit.

In this coupling of the prior art the male and female coupling elements are each mounted on a carrier. By moving the carriers toward each other the male and female coupling parts can be brought into mutual contact to form a connection. There is however the danger herein of the carriers being moved toward each other at an angle so that a properly sealing coupling is not effected. This coupling of the prior art further results in an awkward construction which is difficult to handle. Another drawback is that at least one of the coupling parts must be fixed in one of the plates with a certain clearance because couplings of such a construction can never be manufactured with the required precision.

The object of the present invention is to obviate the above stated problems.

This object is achieved in that the male part and the female part of the rapid-action coupling each comprise a shell formed in one piece.

According to a preferred embodiment, at least at the position of the separating plane between the male and female part, the connecting channels arranged in the said parts are concentric.

This results in the advantage that the male part of the rapid-action coupling can rotate relative to the female part of the rapid-action coupling, which reduces possible torsional tensions in the rapid-action couplings and the conduits connected thereto.

According to yet another embodiment the first and the third conduit and the second and the fourth conduit are mutually concentric at least at the connection to the male part respectively the female part. This has the advantage that concentric conduits can be used, which simplifies the conduit configuration; for the user it is then as if he couples only at least one conduit instead of two.

Other attractive embodiments will become apparent from the description following hereinbelow which also serves as elucidation of the annexed drawings, in which.

Figure 1:
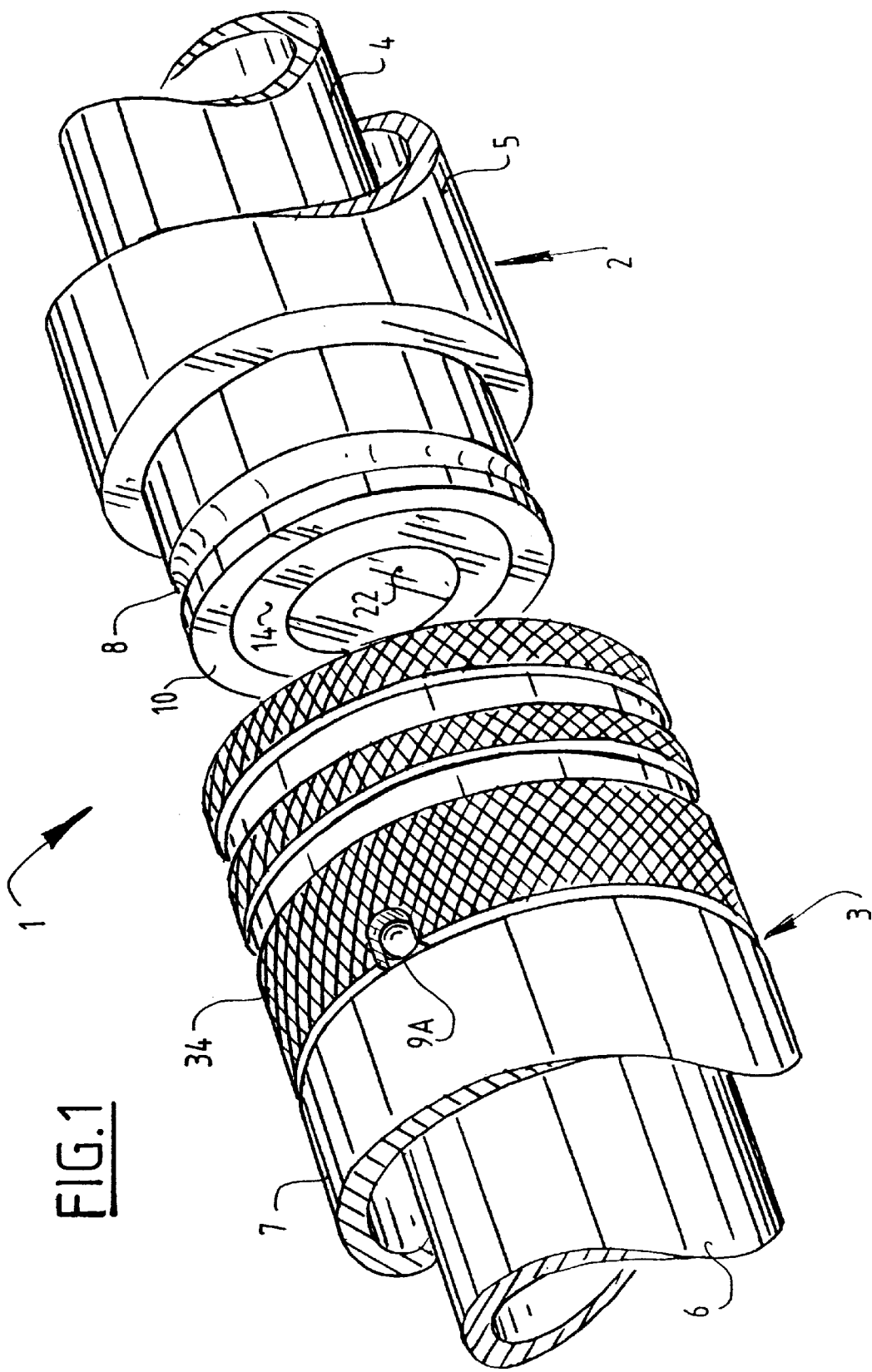
FIG. 1 shows a schematic perspective view of the configuration of the coupling according to the present invention.

Shown in FIG. 1 is a rapid-action coupling 1 which is formed by a male part, designated in its entirety with 2, and a female part 3, designated in its entirety with 3. The male part 2 is connected to a first conduit 4 which is arranged centrally and to a third conduit 5 which is arranged concentrically relative to the first conduit 4 and extending therearound. In similar manner the female part 3 is connected to a second conduit 6 and to a fourth conduit 7 arranged concentrically therearound.

For fixation of the male and female part the male part 2 is provided with a groove 8 extending all around on the outer surface side, into which groove at least one ball stop 9 connected to the female part 3 engages during fixation in the male part.

The construction and operation of the coupling will now be described with reference to FIG. 3.

Figure 3:
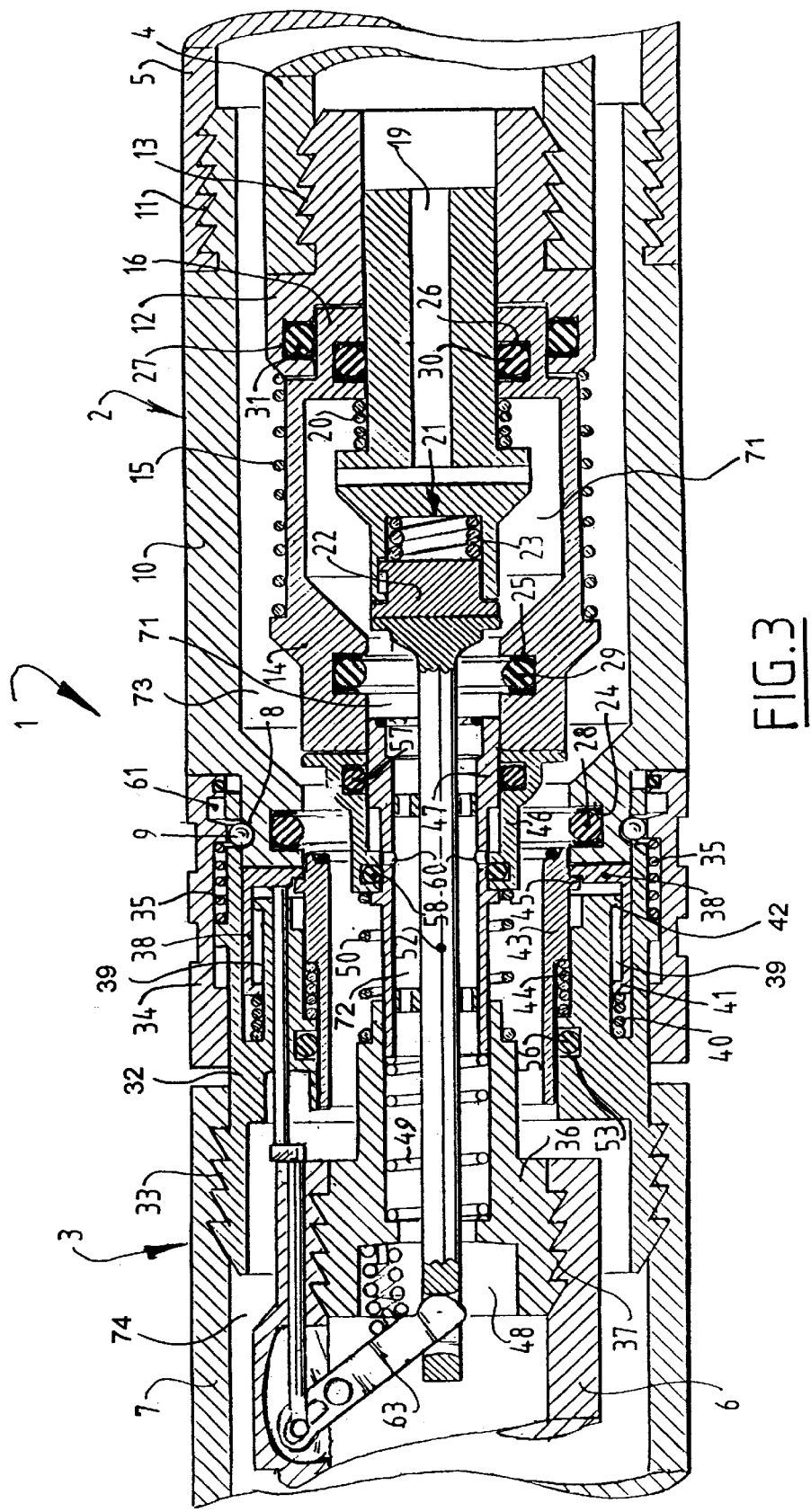
FIG. 3 is a view corresponding with FIG. 2 in the coupled situation.

As shown in FIG. 3, the male part 2 comprises an external bushing 10 which is narrowed toward the coupling surface. On the side of the conduit 5 the bushing 10 is provided with an edge toothing 11 for engagement on conduit 5. Fixedly connected to bushing 10 in the interior thereof is an internal bushing 12 which is connected to the external bushing 10 by radially extending connecting elements (not shown in the drawing). The internal bushing 12 is also provided with a toothing 13 extending therearound.

Figure 2:
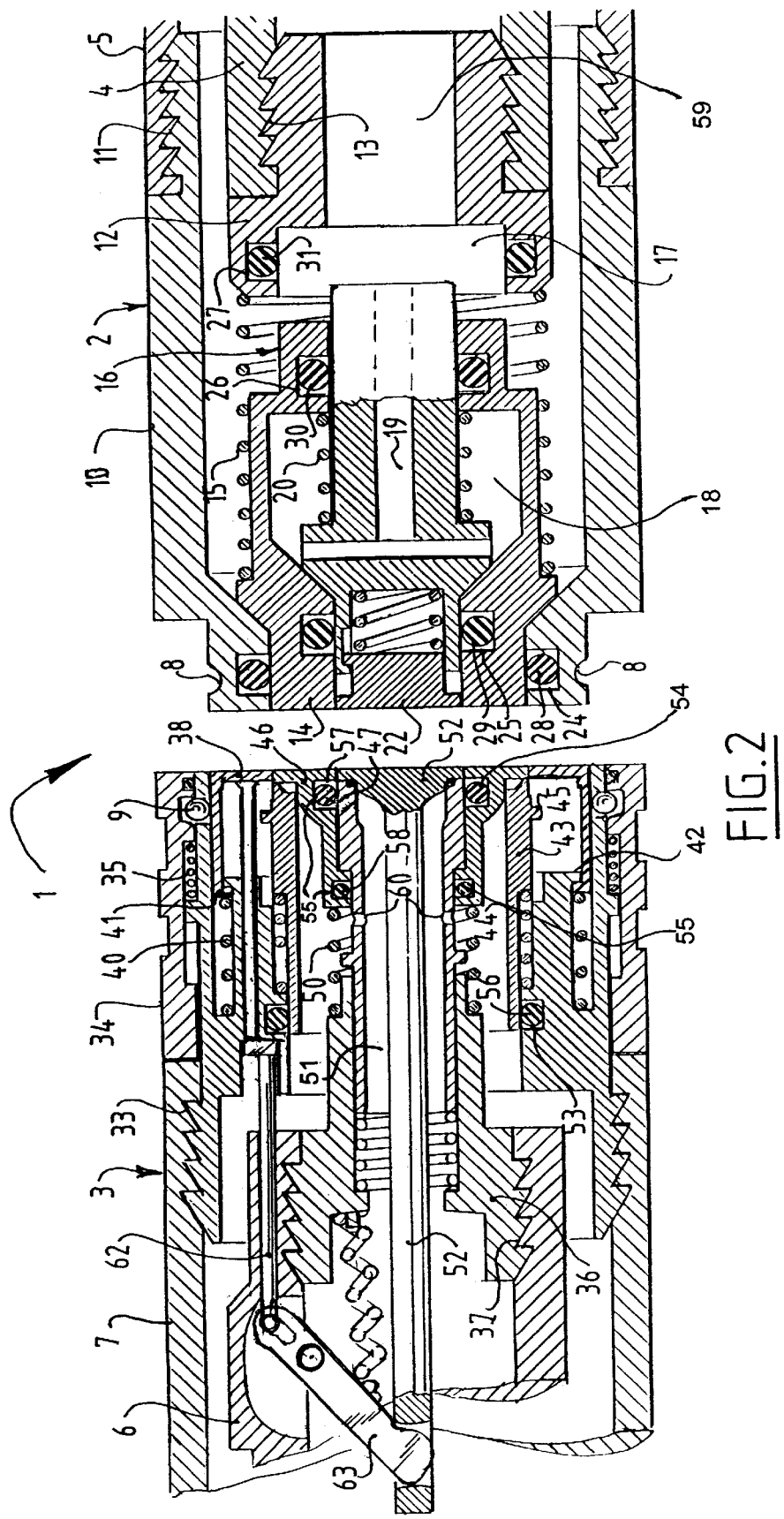
FIG. 2 shows a sectional view of a preferred embodiment of a male part and a female part of the coupling according to the present invention in the non-coupled situation.

Further arranged in bushing 10 is a movable bushing 14 which is urged by means of a helical spring 15 to the position which is shown in FIG. 2 and in which the end surface of bushing 10 coincides with the end surface of the movable bushing 14. By means of exerting an inward directed force on the end surface it is possible to cause bushing 14 to move to the position shown in FIG. 3, wherein a narrowing 16 of the end surface is received into a cavity 17 arranged in the internal bushing 12.

Further formed in the movable bushing 14 is a hollow space 18 in which a central bushing 19 is movable in longitudinal direction. The central bushing 19 is here also urged by means of a helical spring 20 to its position as shown in FIG. 2. Finally, a recess 21 is arranged in the end surface of central bushing 19, in which recess is arranged a sealing cap 22 which is urged by means of a spring 23 to its position as shown in FIG. 2. The end surface of cap 22 forms a flat end face together with the end surface of bushing 10 and internal bushing 14. This is important in preventing fouling; in the drawn situation possible contaminants can easily be wiped off.

Further arranged in the diverse components are annular recesses 24, 25, 26 and 27 in which sealing O-rings 28, 29, 30 and 31 respectively are arranged. The function of such O-rings will of course be apparent; this function requires no explanation here.

The female part 3 of the coupling is formed essentially by an outer bushing 32 which is provided with an array of annular fastening ribs 33 intended for fastening to the fourth conduit 7. Arranged around the outer bushing 32 and concentrically thereof is a fixation, locking bushing 34 which is pressed by means of a helical spring 35 to the position shown in FIG. 2, in which the ball stops 9 are received in a groove arranged in the locking bushing 34.

The female part 3 of the coupling further comprises an internal bushing 36 which is connected to outer bushing 32 by means of ribs (not shown) extending in radial direction.

Inner bushing 36 and outer bushing 32 thus form a rigid whole. Arranged on the outside of the inner bushing is an array of fixing teeth 37 onto which the second conduit 6 is connected.

Further arranged in the female part is a plurality of movable bushings, i.e. a first movable bushing 38 which extends partially in a slot 39 arranged in outer bushing 32 an extending all around. Arranged in slot 39 is a helical spring 40 which presses the first movable bushing to its position as shown in the drawing. In order to limit the movement of the first movable bushing 38 this latter is provided with an edge 41 which engages against an edge 42 arranged on outer bushing 32.

A second movable bushing 43 is further arranged which is likewise movable in longitudinal direction and which is urged to its shown position by means of a helical spring 44. The second movable bushing 43 is provided with an edge 45 with which its movement is limited in one direction. Its longitudinal movement in the other direction is limited by a third movable bushing 46.

The third movable bushing 46 extends round a fourth movable bushing 47. The fourth movable bushing 47 is movable inside a cavity 48 which is arranged in internal bushing 36 and in which a helical spring 49 is arranged for urging the fourth bushing 47 to its position as shown in the drawing. A helical spring 50 is arranged round the fourth bushing 47 for urging the third bushing 46 to the shown position.

Finally, inside a cavity 51 arranged in the fourth movable bushing is arranged a stamp 52 which likewise extends through the cavity 48 arranged in internal bushing 36.

Further arranged in a number of bushings is a number of grooves 53,54,55, in each of which is arranged an O-ring 56,57,58.

The movable bushing 38 is connected by means of a rod 62 to a lever 38 which is mounted in internal bushing 36. The free end of lever 38 engages onto the shank of stamp 52.

The operation of the rapid-action coupling will now be elucidated.

It is pointed out initially that in the male part 2 of the coupling the first conduit 4 connects onto a cavity arranged in internal bushing 12 and serving as guide channel. In the position shown in FIG. 2 this cavity 59 communicates via the passage between internal bushing 12 and movable bushing 14 with the space between external bushing 10 and internal bushing 12. This results in the shown situation in a short-circuit between the first and the third conduit.

In similar manner there is a short-circuit in the female part 3 between the space between outer bushing 32, internal bushing 36 and the internal cavity 48 via passage 60. This brings the advantages as stated in the preamble of the present tax.

When a coupling is made, the stepped part of the outer bushing 10 of the male part 2 of the coupling is placed into contact with the flat surface of the female part 3 of the coupling. The male part 2 is subsequently pushed inward. The four movable bushings 38,43,46 and 47 of the female part 3 of the coupling are herein initially pushed inward, this until the groove 8 arrives beneath the groove 61 arranged in the outer bushing 32 of the female part 3 and the balls 9 are pressed into the groove 8. Due to the action of spring 35 the fixation bushing 34 of the female part is then moved toward the male part 2, whereby the ball stops 9 are enclosed in cavity 8 and fixation takes place.

When both parts are moved into engagement the external bushing 10 of the male part will press inward against the end face of the first movable bushing 38. Via rod 62 and lever 63 the stamp 52 is then pressed into the male part 2. The central bushing 19 is hereby pressed inward.

According to a preferred embodiment the fixation bushing 34 is provided with a spring (not shown) which causes the fixation bushing 34 to rotated around the central axis of the coupling. A bayonet-like construction is further provided whereby in the thus obtained position the fixation bushing 34 cannot be moved to the position shown in FIG. 2, thus obtaining a bayonet fitting-type fixation.

The diverse bushings are further urged to positions as shown in FIG. 3 by the diverse springs included in the construction of both parts 2,3, whereby a coupling of the first conduit 4 to the second conduit 6 and of the third conduit 5 to the fourth conduit 7 is obtained. This is achieved by the internal and external connecting channels 71,73 of the male part being coupled to the internal and external connecting channels 72,74 of the female part. The thus obtained situations is shown in FIG. 3. It is pointed out here that due to the mutual displacement of internal bushing 12 and movable bushing 14 the short-circuit between the first and third channel is closed and that by shifting the third movable bushing 46 relative to the fourth movable bushing 47 the passage 60 is closed, whereby the short-circuit is likewise eliminated on the relevant side.

As stated above, the remaining components shift such that continuous channels are created, this in accordance with the situation shown in FIG. 3.

It will be apparent that it is possible to deviate from the thus described construction in diverse ways without falling outside the scope of the invention.

What is claimed is:

1. Rapid-action coupling comprising: a male part connected to a first and a third conduit and a female part connected to a second and a fourth conduit for releasable mutual connection of at least the first conduit to the second conduit and the third conduit to the fourth conduit, said male part and said female part each comprise a one piece outer shell, connecting channels and an end face at an end thereof, at least a portion of each of the connecting channels within the male part are concentric and at least a portion of each of the connecting channels with the female part are concentric, and wherein the end face of each part is closed when said parts are separated by elements located in a single plane that is coextensive with said end face.

2. Rapid-action coupling as claimed in claim 1, wherein one of the conduits is connected to a source of pressure.

3. Rapid-action coupling as claimed in claim 2, wherein said connecting channels in each of said parts include an internal connecting channel and an external connecting channel, and wherein said rapid-action coupling is adapted during coupling to make an initial connection between the internal connecting channel in the male part and the internal connecting channel in the female part and to make a subsequent connection between the external connecting channel in the male part and the external connecting channel in the female part.

4. Rapid-action coupling as claimed in claim 2, wherein the connecting channels within the male part are connected in fluid communication with each other and the connecting channels within the female part are connected in fluid communication with each other when the parts are not coupled together.

5. Rapid-action coupling as claimed in claim 2, wherein one of the parts of the coupling is provided with a concentric locking ring, said locking ring is rotatably moveable along a longitudinal axis of said one of the parts and is also moveable in a direction parallel to said longitudinal axis from a first position to a releasing position; and wherein said one of the parts also comprises a spring that is arranged to urge the locking ring to a position other than said releasing position.

6. Rapid-action coupling as claimed in claim 2, wherein one of said first and second conduits is capable of being connected to the source of fluid pressure.

7. Rapid-action coupling as claimed in claim 1, wherein said connecting channels in each of said parts include an internal connecting channel and an external connecting channel, and wherein said rapid-action coupling is adapted during coupling to make an initial connection between the internal connecting channel in the male part and the internal connecting channel in the female part and to make a subsequent connection between the external connecting channel in the male part and the external connecting channel in the female part.

8. Rapid-action coupling as claimed in claim 3, wherein the internal and external connecting channels within the male part are connected in fluid communication with each other and the internal and external connecting channels within the female part are connected in fluid communication with each other when the parts are not coupled together.

9. Rapid-action coupling as claimed in claim 7, wherein one of the parts of the coupling is provided with a concentric locking ring, said locking ring is rotatably moveable about a longitudinal axis of said one of the parts and is also moveable in a direction parallel to said longitudinal axis from a first position to a releasing position; and wherein said one of the parts also comprises a spring that is arranged to urge the locking ring to a position other than said releasing position.

10. Rapid-action coupling as claimed in claim 1, wherein the connecting channels within the male part are connected in fluid communication with each other and the connecting channels within the female part are connected in fluid communication with each other when the parts are not coupled together.

11. Rapid-action coupling as claimed in claim 10, wherein one of the parts of the coupling is provided with a concentric locking ring, said locking ring is rotatably moveable about a longitudinal axis of said one of the parts and is also moveable in a direction parallel to said longitudinal axis from a first position to a releasing position; and wherein said one of the parts also comprises a spring that is arranged to urge the locking ring to a position other than said releasing position.

12. Rapid-action coupling as claimed in claim 1, wherein one of the parts of the coupling is provided with a concentric looking ring, said locking ring is rotatably moveable about a longitudinal axis of said one of the parts and is also moveable in a direction parallel to said longitudinal axis from a first position to a releasing position; and wherein said one of the parts also comprises a spring that is arranged to urge the locking ring to a position other than said releasing position.

13. Rapid-action coupling as claimed in claim 1, wherein each single plane extends in a direction that is perpendicular to a longitudinal axis of the coupling.

14. Rapid-action coupling as claimed in claim 1 wherein said plane and said end face extend perpendicular to a longitudinal axis of the coupling.

* * * * *